Patented July 20, 1943

2,324,900

UNITED STATES PATENT OFFICE 2,324,900

MANUFACTURE OF VARNISH BASES

László Auer, East Orange, N. J., assignor to Ridbo Laboratories, Inc., Paterson, N. J., a corporation of New Jersey No Drawing. Original application February 12, 1940, Serial No. 318,650. Divided and this application March 29, 1941, Serial No. 385,847. In Hungary May 19, 1926

21 Claims. (Cl. 106—219)

This invention relates to the manufacture of modified varnish bases, such as fatty oils, natural and synthetic resins, etc., and which also comprises the modified products obtained, as more hereinafter set forth and as claimed. This application is a division of Serial No. 318,650, which itself is a continuation-in-part of my prior application Serial No. 143,786, filed October 23, 1926, and several divisions and continuations thereof, previously filed by me, particularly of my prior application Serial No. 359,425, filed April 30, 1929, as a continuation-in-part of said Serial No. 143,786. The said parent application and the several continuations and divisions thereof, together with the patents which have issued upon the same, are set forth in the following table.

TABLE

| Serial No.— | Filed— | Patent No.— | Issued— |
|---|---|---|---|
| 143,786 | Oct. 23, 1926 | 2,189,772 | Feb. 13, 1940 |
| 273,159 | Apr. 26, 1928 | 1,985,230 | Dec. 25, 1934 |
| 273,160 | Apr. 26, 1928 | 1,985,231 | Dec. 25, 1934 |
| 359,424 | Apr. 30, 1929 | 2,007,968 | July 16, 1935 |
| 359,425 | Apr. 30, 1929 | 2,213,944 | Sept. 10, 1940 |
| 359,426 | Apr. 30, 1929 | 1,980,366 | Nov. 13, 1934 |
| 359,427 | Apr. 30, 1929 | 1,957,437 | May 8, 1934 |
| 446,170 | Apr. 21, 1930 | 2,234,949 | Mar. 18, 1941 |
| 446,171 | Apr. 21, 1930 | 1,980,367 | Nov. 13, 1934 |
| 446,172 | Apr. 21, 1930 | 2,213,943 | Sept. 10, 1940 |
| 446,174 | Apr. 21, 1930 | 2,180,342 | Nov. 21, 1939 |
| 466,587 | July 8, 1930 | 2,106,708 | Feb. 1, 1938 |
| 188,014 | Jan. 31, 1938 | 2,244,666 | June 10, 1941 |
| 236,800 | Oct. 24, 1938 | 2,234,545 | Mar. 11, 1941 |
| 305,409 | Nov. 20, 1939 | 2,293,038 | Aug. 18, 1942 |
| 318,650 | Feb. 12, 1940 | 2,298,270 | Oct. 13, 1942 |
| 356,103 | Sept. 9, 1940 | | |
| 383,049 | Mar. 12, 1941 | 2,309,088 | Jan. 26, 1943 |
| 383,339 | Mar. 14, 1941 | 2,298,915 | Oct. 13, 1942 |

In my prior applications more fully identified ante, I have described processes of modifying the properties of organic isocolloids, such as fatty oils, resins etc., particularly their physical properties such as viscosity, melting point, etc., as well as other properties thereof. As stated in said applications, the modified organic isocolloid materials obtained by the processes described therein, are useful for various purposes; the modified products so obtained from fatty oils, resins, etc. being useful and advantageous in making varnishes, lacquers and other coating and plastic compositions, and in making other useful products, as described in said applications.

The present invention also relates to such processes. This application is directed to certain of the processes described in said prior applications.

In my prior applications, listed ante, I have disclosed various methods of modifying organic isocolloid materials using many different modifying agents. As there disclosed, my generic invention relates to processes for the modification of the physical properties of organic isocolloids and to the modified organic isocolloid products obtained. By the terms "organic isocolloids" and "organic isocolloid materials," I mean organic isocolloid substances wherein the dispersed phase and the dispersion medium of the colloidal system thereof are both of the same chemical composition but in a different physical or colloidal state. That is, such organic isocolloids are mixtures of chemically similar organic compounds wherein one or more of these compounds are dispersed or dissolved in the others which serve as the dispersion medium of this isocolloid system.

Likewise, in my said prior applications I have given various illustrative examples, of the modifying agents useful in my processes of modifying organic isocolloid materials. As disclosed in those applications, I have found that by dispersing or dissolving such modifying agents in the organic isocolloid materials, I obtain modified products having altered physical properties, etc. which are useful for various purposes in the commercial or industrial arts. As there disclosed, the modifying agents are employed in minor amounts and are inorganic or organic compounds containing ions, radicals or residues capable of influencing the said modification of the organic isocolloid substance.

Such modifying agents are "electrolytes" or polar compounds, such as salts of organic and inorganic acids, organic and inorganic acids, metallic derivatives of inorganic compounds etc., as disclosed in my Ser. No. 143,786 (Patent 2,189,772). And as disclosed in my Ser. No. 359,425 (Patent 2,213,944), organic polar compounds comprising within the molecule an acidic inorganic residue and an organic residue are advantageous modifying agents, in my processes. By an acidic inorganic residue, I mean such an inorganic residue as can be converted by the addition of one or more hydrogen atoms or by the addition of one or more molecules of water, and/or by the action of elevated temperatures into an inorganic acid (including carbonic acid as inorganic), leaving the organic residue behind. It will be seen from the above definition and from the illustrative compounds disclosed in my Ser. No. 359,425 that this generic class of modifying agents includes such compounds as (1) organic halogen derivatives, (2) organic sulphonic acids and their halides and salts, including esters thereof, (3) esters of inorganic acids, (4) inorganic salts of organic bases and (5) organic nitro compounds, etc. Many examples illustrative of each of these classes are given in my said Ser. No. 359,425 (Patent 2,213,944). Some of the modifying agents specifically disclosed in that application are illustrative of other classes of modifying agents useful in my processes. That is, they contain a plurality of constituents, groups or radicals imparting polarity to such compounds.

Among the applications mentioned ante, of which the present application is a continuation-in-part, this invention relates particularly to Ser. No. 143,786 (Patent 2,189,772); 359,425 (Patent 2,213,944); 318,650; and 356,103.

According to the present invention it has been found that modifying agents which are difficultly soluble or practically insoluble in water have particular advantages in treating organic isocolloid varnish bases.

As disclosed in my prior application Ser. No. 359,425, I obtain modified products suitable for making improved water-fast varnishes and lacquers and like compositions, by a suitable choice of modifying agents. And as stated in that prior application, for this purpose I choose modifying agents which are substantially insoluble in water. And as further disclosed in my said Ser. No. 359,425, I find that agents of this type, such as:

Tin carbonate
Tin sulphite
Tin sulphide
Antimony sulphide
Zinc sulphide
Barium sulphide
Barium carbonate
Barium sulphate
Calcium sulphite
Strontium sulphite
Magnesium sulphite
Lead sulphite
Cadmium sulphite
Cadmium sulphide
Mercuric sulphate and the like, are advantageous in my processes for modifying fatty oils, resins and other organic isocolloids.

However, some of these salts are very difficultly soluble in the starting materials to be modified, for instance, in fatty oils. In such cases, it is advantageous to produce the modifying agent in situ. Thus barium sulphate is very insoluble in linseed oil, while magnesium sulphate and barium peroxide are more easily soluble, and I therefore dissolve these two substances, namely the magnesium sulphate and barium peroxide, in the linseed oil and produce within the oil the insoluble modifying agent, barium sulphate. By using zinc carbonate and barium peroxide in this way, I produce in the oil barium carbonate and zinc oxide, both insoluble in water, and the product subsequently obtained gives an excellent, water-resistant varnish. Likewise, I have found it advantageous to use both a metal salt and a metal peroxide in modifying resins, as well as fatty oils, as further disclosed in said prior application Ser. No. 359,425 and other prior applications.

As disclosed in Ser. No. 359,425, I have found that the use of oxygen-generating substances, such as peroxides and especially peroxides of metals giving water-insoluble compounds when combined with the anion of the modifying agent used, is particularly suitable for the production of varnish bases by my invention from fatty oils, resins and other organic isocolloids. The oxygen which results from this procedure seems to have special value for this purpose. The following examples among others illustrate this feature:

| | | |
|---|---|---|
| Zinc carbonate | in conjunction with one of the following: | Bismuth peroxide, manganese peroxide, nickel peroxide, zinc peroxide, strontium peroxide, cerium peroxide. |
| Mercuric carbonate | with | Barium peroxide, or magnesium peroxide. |
| Lead carbonate | with | Barium peroxide. |

As disclosed further in my Ser. No. 359,425, resins give good lacquer bases by solidification; the resin being converted into a hardened resin by the method disclosed by me therein. And this solidification of resins, as further disclosed in said Ser. No. 359,425, is readily obtained when the resin is heated with minor amounts of both a metal salt, such as lithium sulphite, and a metal peroxide, such as zinc peroxide, say 5% of each on the resin; the heating being continued until a hardened resin is obtained upon cooling.

With regard to the raw materials which can be used in the methods of the present invention I may mention the following:

*Fatty oils of vegetable and animal origin, including drying, semi-drying and non-drying fatty oils*

(a) Vegetable oils:

(1) Drying oils, such as
Linseed oil
Tung oil (2) Semi-drying, such as
Poppyseed oil
Sunflower oil
Rapeseed oil
Soya bean oil
Pineseed oil (3) Non-drying, such as
Cottonseed oil
Corn oil
Olive oil
Castor oil (b) Marine-animal oils
Fish oil (semi-drying)

(c) Thickened oil
Linseed stand oil

Fatty acids of drying, semi-drying and non-drying fatty oils, advantageously those of drying oils.

Esters of such fatty acids, including esters thereof with polyhydric alcohols, such as glycerol, glycols, etc., or with monohydric alcohols of high molecular weights; artificial oils, waxes and resins, particularly those containing esters of the acids of drying fatty oils.

Waxes, including vegetable, mineral and animal waxes, such as carnauba, palm or myrtle wax, ozokerite or Montan wax, beeswax, wool-wax, sperm oil (liquid wax), spermaceti wax, etc., and other solid and liquid wax-like organic isocolloid materials containing high molecular weight fatty acids or esters thereof with monohydric or dihydric alcohols.

Natural resins, such as gum and wood rosins, copals and other varnish resins of natural origin.

Synthetic resins, particularly those made from or containing rosin and other natural varnish resins, as a component thereof, and those made from or containing the acids of fatty oils and of natural resins and their derivatives such as esters of said acids with glycerine or other polyhydric alcohols, namely ester gum (glycerol rosinates), rosin-modified or drying alkyd resins and like complex synthetic esters of such acids, particularly those containing esters of the acids of drying fatty oils. Resins containing esters of pentaerithritol, sorbitol, and mannitol may also be included.

The above organic isocolloid materials may be used with advantage in the present invention to obtain various modified products useful as and in coating compositions. Excellent varnish bases can be readily obtained from the drying fatty oils and resins.

In the case of applying the two step methods more particularly described in application Ser. No. 356,103, I can prepare blended mixtures of a modified oil and a modified resin, by using a fatty oil in one step and a resin in the other step. Likewise, blended mixtures of two different types of modified resins or of modified fatty oils can be readily obtained in like manner, using one resin or oil in the first step and another and different oil or resin in the second step.

Also I may use other organic isocolloid materials in the present invention to obtain modified organic isocolloid products useful as and in coating compositions. Of these isocolloid materials, the following are typical:

Mineral oil fractions, of high molecular weight and of high boiling point, containing substantial amounts of naphthenic bodies and other unsaturated compounds, such as high boiling fractions of naphthenic oils obtained by distillation or cracking or both, and high boiling naphthenic mineral oil fractions obtained by solvent extraction of mineral oils.

Goudrons or petroleum distillation resides.

Asphalt and asphalt oils.

Tar and tar oils.

Pitches.

Rubber and rubber-like hydrocarbons (synthetic rubbers.)

Chemically pure organic isocolloid bodies or materials, such as styrene.

The above organic isocolloid materials are complex hydrocarbon mixtures containing unsaturated carbon compounds, namely compounds containing one or more double bonds or points of unsaturation. And they may be used with advantage in the present invention. By using such organic isocolloid materials in the present methods, I obtain modified isocolloid products useful as and in coating compositions and in plastic compositions.

From the list of suitable organic isocolloid materials given ante, clearly many different modified isocolloid products can be obtained from various combinations of them with my modifying agents according to the present invention, and a wide variety of products useful in the manufacture of varnishes, linoleum, rubber composition, etc., obtained within the broad scope of this invention. Plastic and liquid coating compositions are easily produced for a variety of industrial applications, by my method.

As shown in my prior applications, a small percentage of the modifying agent by weight on the starting material is sufficient in most cases to produce the desired modification. Generally 1 to 10 per cent of the modifying agent should be added. But in certain cases satisfactory results may be obtained with less than 1 per cent of the modifying agent. For instance, many varnishes and other compositions containing my modified oils and resins and only a fraction of a per cent of a modifying agent of the type described have improved and advantageous properties. In some cases the percentage of modifying agent used may be as low as 0.01 per cent in such improved compositions or final products. On the other hand, in other embodiments of this invention I may employ more than 10 per cent of the modifying agent; sometimes as high as 30 per cent. This is advantageous in making greatly modified products, and in some cases from 10 to 30 per cent of the modifying agent, usually 20 to 25 per cent, may be used. The greatly modified products so obtained are themselves useful as modifying agents for other organic isocolloids or for more of the same isocolloid, as disclosed in my applications Ser. Nos. 356,103 and 446,172 (Patent 2,213,943). Thus the modified products obtained by the present invention may contain from 0.01 to 30 per cent of a compound difficulty soluble in water as the modifying agent.

Ser. Nos. 446,172 (Patent 2,213,943) and 356,103 describe the use of greatly modified isocolloids as modifying agents. If 5% of a greatly modified isocolloid fatty oil, for instance, is added to 100 parts of an untreated fatty oil, and the greatly modified product itself had 5% concentration of a certain modifying agent, the concentration of the modifying agent in the final oil product will be 0.25%. In case a varnish is made out of this oil by the addition of equal parts of resin compounds to the oil, the concentration of the modifying agent figured on the oil plus resin system, will be as low as 0.125%.

As disclosed in my prior applications, I prefer to add the modifying agent to the starting material in dry form, i. e. without the presence of water.

In making my modified isocolloid products by the present invention, I employ an amount of a compound difficulty soluble in water within the ranges given ante and thoroughly incorporate the compound in the organic isocolloid to be modified.

The effectiveness of the modifying agent is appreciably greater when it is applied in the colloidal condition, for example by dispersion in the starting-material by means of some form of mill.

In order to insure complete dissolution or dispersion of the modifying agent, the operation of dissolving or dispersing it in the organic isocolloid should be carried out under the application of heat. That is, it is advantageous to heat the mixture of organic isocolloid and modifying agent as disclosed in my prior applications. The degree of heat necessary depends upon the nature of the substance under treatment and also the modifying agent used.

Generally the temperatures employed are sufficient to produce a uniform homogeneous modified product with the particular mixture employed. As stated in my Ser. No. 143,786, the temperatures giving the best results are those considerably above room temperature and below the boiling point of the materials employed.

And as stated in that application, the organic isocolloid (starting material) and the modifying agent may be melted together, that is, fused into a homogeneous composition.

In general, as disclosed in my prior applications, temperatures from 100 to 300° C. give satisfactory results in most cases.

Only occasionally are temperatures above 300° C. necessary to produce satisfactory results. In such cases, higher temperatures may be employed, say as high as 350° C. if necessary. But generally it is desirable to use lower temperatures and this is possible in most cases.

In general, the temperatures employed in my present processes are below that at which the resulting modified organic isocolloid decomposes but are sufficient to fuse or melt the mixture into a uniform homogeneous modified product. And as stated ante, temperatures between 100 and 300° C. are advantageous in most cases and are usually employed in my present processes. However, other suitable temperatures may be employed. As stated in my Ser. No. 143,786 (Patent 2,189,772) the complete dispersion, molecular or colloidal, of the modifying agent in the organic isocolloid material to be treated and modified is an essential element of my processes.

The heat treatment promotes the complete (molecular or colloidal) dissolution of the modifying agent in the substance to be treated. It also facilitates the desired modification. In some cases it is desirable to continue the heat treatment after the dissolution or dispersion of the modifying agent is substantially complete. In this way further modification of the isocolloid can be obtained, as shown in my prior applications.

In those cases in which the concentration of the disperse phase of the isocolloid system is high enough, the isocolloid may be melted together with the modifying agent until the melt forms a clear homogeneous mass after cooling. In other cases, linseed oil, for instance, in which the disperse phase concentration must be increased by a heating process, it is necessary to heat for a longer time at higher temperatures, 250-300° C., in order to bring about the necessary increase of the disperse phase concentration.

In many cases, the compounds difficultly soluble in water and the metal peroxides used in the present processes need temperatures above 250° C. for their complete dispersion in the isocolloids to be treated. As the dispersion of the modifying agent in the isocolloid to be treated is an important feature of my process, the heat applied has to be suitable to facilitate the dispersion of the modifying agent in the starting material to be treated.

The products of the reaction vary in the case of any one definite starting material according to:

(a) Variations made in the nature of the modifying agent.
(b) The percentage of the modifying agent used.
(c) The duration of heating.
(d) The reaction temperature.
(e) The nature and physical state, pressure, of the gas present in reaction chamber, etc.

The reaction may be further influenced by irradiation with short-wave oscillating energy, ultraviolet rays, X-rays, etc.

The modifying process may be accelerated, not only by radiations as mentioned in my prior applications, but also by making the mixture of starting-material and electrolyte part of an electric circuit.

Likewise, I have found that the presence of air or other gases somewhat alters the results obtained. For instance, the products obtained by heating in the presence of air are somewhat different from those obtained when the mixture is heated in contact with other gases, such as carbon dioxide, nitrogen, hydrogen sulphide, sulphur dioxide, etc., or mixtures of gases. It may be stated with reference to the action of gases that generally speaking rarefaction of the gases present in the reaction chamber by the reduction in pressure tends to intensify their action in my processes.

In my present processes, I may employ a gas treatment in conjunction with the modifying action of the modifying compounds. The gas treatment may be carried out by blowing the gas through the reaction mixture or simply by passing it over the mass contained in the reaction chamber. For this purpose I may employ active or inert gases. In doing so, I find that $CO_2$, nitrogen, hydrogen sulphide and $SO_2$ are advantageous. Further, the gas may be produced in situ in the reaction mass by using substances which under the conditions of the reaction develop the desired gas, such, for instance, as carbonates, sulphides, sulphites and the like, all of which develop corresponding gases in the reaction mass.

Likewise, if desired, the modifying agent may be produced in situ within the mass under treatment.

The addition of a small amount, generally not more than 5% of the weight of the starting material of secondary purely organic metal-free reagents such as aldehydes, phenols, alcohols, ketones, hydrocarbons etc., may have favorable results.

It is further possible to use the above-described reagents, in combination with any modifying agent described in any one of the above mentioned specifications—e. g. with organic or inorganic acids, with salts, with organo-metallic compounds, with compounds comprising within the molecule an acidic inorganic residue and an organic residue (viz. my application Ser. No. 359,425 (Patent 2,213,944) and Ser. No. 318,650)—with amino compounds.

As stated in prior applications the application of an electric potential within the reaction mass influences favorably the reaction.

I have further discovered that the dissolution of the modifying agents in the starting-materials may be appreciably facilitated by the addition of certain "auxiliary agents" or "sensitisers". These fall into two groups, namely, the purely inorganic (e. g., silica gel, fuller's earth), and the purely organic, e. g.:

| | |
|---|---|
| Formaldehyde | Quinoline |
| Phenol | Pyrogallol |
| Thiocarbanilide | Benzene |
| Benzidine | Glycerol |
| Hexamethylenetetramine | Phthalimide |
| Alpha-naphthol | |

The specific examples of auxiliary agents here mentioned are to be taken as typical of the substances which have been successfully used for this purpose and not as comprising all the effective substances. Some electrolytes, and quite a number of the modifying agents disclosed in prior applications and containing an acidic inorganic residue and an organic residue in the molecule, act as auxiliary agents (sensitisers) when used in conjunction with other modifying agents.

Thus, e. g. the dissolution of an inorganic salt type of modifying agent in linseed oil is facilitated and the color of the product is made lighter by the addition of such compounds as amino-azobenzene sulphate, aniline sulphate, nitro cresyl carbonate, dimethyl sulphate, trichloroacetic acid, benzene-sulphonic acid, iodoform, naphthalene tetrachloride, pinene hydrochloride, m-xylidinesulphonic acid, beta-naphthylamine-6:8 disulphonic acid, beta-naphthylamine 6-sulphonic acid, acetyl chloride, p-nitroacetanilide, chloral hydrate, and triphenyl phosphate, naphthalene-1-sulphochloride, diphenylamine hydrobromide, 5 (or 3) -amino salicylic acid, 2:6-naphthalene disulphonic acid, o-dichlorobenzene, etc.

The advantages of a rapid dissolution of the modifying agent are greatest in those cases where a clear, pale or colorless product is desired, especially, for example, for the varnish industry. They are also important in the manufacture of oil products for the rubber industry.

Plasticizers may be added to the starting-materials, or during or after the process of modification, in order to obtain a softer final product. These plasticizers may be purely organic (e. g. glycerol, phenol) or partly organic and partly inorganic (e. g. tricresylphosphate).

Where the starting-materials are fatty oils, small quantities of resins, for example rosin, may be added to the reaction-mixture in order to prevent the formation of froth during the modifying process.

A siccative or siccatives, such, for example, as may be used in the varnish industry, may be added to the reacting materials for the purpose of eliminating stickiness in the resulting product.

The uses of the products obtained according to my invention are various, and are mainly described in the above mentioned earlier applications. If the reagents used in the reaction are themselves only very slightly soluble in water, most of the oil and resin products give varnishes having very satisfactory water-resisting properties.

During most of the modification processes the iodine value of the starting material and in the case of fatty oils often also the saponification value and in certain cases the acid value decreases.

When the modifying agent contains free acid radicals or may yield acid on the action of heat, slight increase in acid value and saponification value may also be observed. In most of the cases such increase however is of a temporary nature, and longer heating may counteract the same.

Products obtained by processes described in the present application may be advantageously vulcanized and used in the vulcanized condition in the rubber trade, especially as rubber substitute made from modified oil products obtained according to the present process, or in the varnish trade as varnish raw materials, e. g., vulcanized oil products and resin products.

The vulcanization may be advantageously influenced by the use of accelerators, e. g., mercaptobenzthiazole, and/or activators, e. g., zinc oxide. If desired, pigments and/or fillers may be added at any convenient stage.

By the vulcanization of oil-products and resin products I have obtained substances which yield new types of lacquers and varnishes. Various combinations of vulcanized and unvulcanized oil products and resin products may be used. For instance, a resin product may be vulcanized and used with an unvulcanized oil product; a vulcanized oil product may be used with an unvulcanized resin product; a mixture of an oil product and a resin product may be vulcanized together, or a solution of such a mixture in a suitable solvent may be treated with a vulcanizing agent. For the vulcanization sulphur, sulphur chloride or other reagents for introduction of sulphur can be used; with sulphur chloride vulcanization occurs in the cold, and this reagent is also suitable for the vulcanization of solutions of the oil-products or resin products. The injurious action of free hydrogen chloride evolved when sulphur chloride is used must be prevented by addition of neutralizing agents or other suitable means. For instance, an inorganic oxide or hydroxide, e. g., calcium oxide or calcium hydroxide, or an organic amine may be mixed into the modified oil or resin products before vulcanization. Or such neutralizing agents can be added to the vulcanizing agent prior to its use. In some cases the vulcanization can be effected prior to the addition of the neutralizing agent. In such cases also the above mentioned agents can be used or the addition of an unsaturated organic substance such as turpentine oil can be found advantageous. The injurious effects of the free hydrogen chloride can also be prevented by passing a gas through the pulverized product or through its solution in a suitable solvent either alone or admixed with or saturated with the vapors of volatile basic substances such as ammonia or trimethylamine or with volatile unsaturated hydrocarbons.

Accelerators such as:

Tetramethylthiuram disulphide,
Heptaldehydeaniline,
Mercaptobenzthiazole.

Antioxidants such as:

p-Aminophenol,
Hydroquinone,
Compounds obtained by condensing alpha and beta naphthylamines or mixtures of these bodies with aldehydes (see Patent 1,777,352);

may be added if desired. Such additions are included in my prior specification as "purely organic bodies." Activators such as zinc oxide may also be added.

The vulcanized products are valuable for varnishes and lacquers, giving films which are very elastic, fast to weathering, and suitable for stoving. After stoving they exhibit a high degree of resilience and hardness. The character of the varnishes and lacquers may be varied by varying the temperature of vulcanization, the proportion of sulphur, the nature and quantity of accelerator and activator, and further by the addition of fillers; e. g. when gas black is applied as a filler the aging properties of the varnish films are improved accordingly The modifying agents used in this invention are also suitable modifying agents to be used in the process described in my application Ser. No. 359,424 (Patent 2,007,958), wherein in the first instance organic isocolloids are modified or partly modified by treatment with modifying agents and thereafter further transformation is effected by emulsification or dispersion in an aqueous medium with or without the aid of emulsifying or dispersing agents and/or protective colloids. According to the present invention compounds, for example, such as those that are difficultly soluble in water, can be used as modifying agents in the first step of this process. Naturally also the products obtained according to the present invention may be subjected to further treatment in the form of aqueous emulsions as in my applications Ser. Nos. 359,424 (Patent 2,007,958), and 361,000 (Patent 2,083,540). The compounds difficultly soluble in water are also satisfactory modifying agents to be used in the process described in my Ser. No. 359,424 (Patent 2,007,958), wherein the starting material is first emulsified in an aqueous medium and thereafter the emulsion is treated with a small amount of a modifying agent.

The following examples illustrate some of the features of this invention, but are not intended to limit the invention. The parts are by weight unless otherwise stated.

EXAMPLE 1

300 parts of linseed oil were heated under vacuum to 270–300° C. for 5 hours with a mixture of 7.5 parts of zinc carbonate and 7.5 parts of barium peroxide.

The modified oil product so obtained was a moderately soft solid, especially suitable for use in the preparation of water resisting varnishes.

EXAMPLE 2

100 parts of rosin, 5 parts of zinc carbonate and 5 parts of barium peroxide were heated in an open kettle to 280–300° C. for one hour.

The modified resin so obtained, upon cooling, was a light colored, hard resin having greatly increased melting point. It yields fast drying varnishes giving hard tough films.

The above Examples 1 and 2 respectively, show the modification of the fatty oil and of the resin, separately, with the metal salt and metal peroxide. Also, the rosin (or other resin) and the fatty oil may be mixed together and the mixture heated with the zinc carbonate and barium peroxide, to modify simultaneously each of them in the presence of the other; both being modified by the treatment. In this way, a varnish base, containing both the modified oil and resin, can be directly obtained. This is advantageous in making varnishes and other compositions having improved drying properties and improved resistance to water. Likewise, ester gum and other resinous synthetic esters containing acids of resins or of fatty oils or both may be so modified by the methods illustrated in these examples. Further, "rosin-modified" phenolic (phenol-aldehyde) resins can also be modified by my methods ante to improve their properties in the same way.

While the use of metal peroxides in conjunction with the metal salts or electrolyte is advantageous, it is not essential to the broader practice of my methods. For, as shown ante, the metal salts or other electrolytes (polar compounds) may be used alone to modify fatty oils, resins and other organic isocolloids. Even the water insoluble salts may be directly added to the fatty oil or resin instead of being formed in situ, to obtain modified products resistant to water.

In any event, as is apparent from the disclosure ante, my invention is not limited to the use of metal peroxides, and, as stated in my Ser. No. 359,425, my invention is not limited to the production of solid varnish bases from liquid fatty oils.

EXAMPLE 3

300 parts of castor oil and 15 parts of strontium carbonate were heated to 280° C., under vacuum of about 25 inches, and the temperature was maintained for 4 hours at between 230–300° C. The product was a yellow, semi-solid oil, yielding valuable coating compositions.

EXAMPLE 4

300 parts of castor oil and 15 parts magnesium carbonate were heated to 200° C., and the temperature maintained at between 200–220° C. for 11 hours, yielding a dark brown, thin oil, suitable for coating compositions.

EXAMPLE 5

300 parts of linseed oil, 15 parts of sodium hydrosulphite and 15 parts benzoyl peroxide were heated under a vacuum of 22 to 29 inches to 250° C., and the temperature slowly raised to 300° C. Violent frothing occurs around 250° C., and frothing subsides only in about 1 hour after the reaction temperature of 300° C. has been reached. The temperature of 300° C. was kept for 4 hours, and the product was then cooled and poured out at around 100° C., yielding a semi-solid mass of a sticky nature. This product is suitable as raw material for vulcanized varnishes. The presence of sodium hydrosulphite, which is readily soluble in water, causes moderate water resistance if the unvulcanized product is used as varnish base. When sodium hydrosulphite is substituted with a compound that is difficultly soluble in water, the water resistance of the resulting product is improved.

EXAMPLE 6

The following materials were weighed into a varnish kettle: 54 lbs. China-wood oil, 18 lbs. of a pure phenolic, oil reactive resin, which is made out of an alkyl- or aryl-substituted phenol and formaldehyde and is oil soluble (e. g. like Bakelite 3360 resin), 2.7 lbs. barium peroxide and 2.7 lbs. zinc carbonate (5% each, based on the oil). Weigh out in a container 5.4 lbs. W. W. rosin. Heat oil and Bakelite resin and reagents to 580° F., chill back with the W. W. rosin to 560° F., cool slowly to 320° F. and reduce. Thinners: 36 lbs. Solvesso #2 (hydrogenated petroleum solvent, similar to xylol in nature), 102 lbs. Solvesso #1 (like Solvesso #2, but similar to toluol in nature), 48 lbs. solvent naphtha #55 of Socony-Vacuum (light naphtha fraction, 15 lbs. denatured ethyl alcohol, 95% strong. Add as driers: 4.4 fl. ozs. of a 6% cobalt solution, 6.6 fl. ozs. of 4% Mn solution, and 13 fl. ozs. of 16% Pb solution. (All percentage figures represent percent of metal in the drier solution.) This varnish dries in 15 to 30 minutes dust-free, and coatings are ready for handling within 2 hours or less. It is an excellent enamel vehicle. Enamels are made out of it by adding pigments to it and grinding the pigments with the varnish in a pebble mill or on a roller mill.

EXAMPLE 7

Formula:

| | |
|---|---|
| China-wood oil_____gals__ | 20.5 |
| N-wood rosin_____lbs___ | 66 |
| A rosin modified maleic alkyd resin (e. g., like Arolite 540)_____lbs__ | 34 |
| China-wood oil for chill-back_____gals__ | 5 |
| Barium peroxide_____lbs__ | 10 |
| Zinc carbonate_____lbs__ | 10 |

Heat resins and modifying agents with oil to 555° F., chill back with 5 gals. of China-wood oil, hold between 540 and 590° F. all together for 30 minutes, let cool and thin at 320° F. with:

Solvesso #2_____gallons__ 11.3
Varnish Makers and Painters Naphtha (light mineral spirits)_____gallons__ 21.6
Solvesso #1_____do_____ 14.44
Alcohol _____do_____ 2.9 and add 46 fl. ozs. of 24% Pb-drier and 20.5 fl. ozs. of 6% Co-drier. This varnish is also an excellent vehicle for fast drying enamels. It is somewhat slower drying than the product of Example 6, but because it is free of phenols it is more light-fast and better for white enamels than the other varnish. Both varnishes can be used alone, unpigmented, as furniture varnishes, or as mixing varnishes with other varnishes.

Free rosin is added to the above varnishes to faciltate the dissolution of the reagents. Rosin is acidic, having an acid value of about 160. Mixed soaps and esters are probably formed in the reaction. The oxygen given off in situ from the peroxide cannot be replaced without disadvantages by blowing air into another product which contains zinc salts alone. Other carbonates and peroxides act similarly to the ones used in this example.

Examples 6 and 7 give very viscous solutions. If varnishes with comparatively high solid content are required, solvents with higher cutting power have to be used. In most cases the products are soluble in petroleum solvents alone, but because the aromatic solvents have a higher cutting power, i. e. yield with less quantity of solvent the same viscosity or with the same quantity of solvent a lower viscosity, it is advantageous to use coal tar hydrocarbons or hydrogenated petroleum hydrocarbons of an aromatic character, in part or wholly, as thinners. The addition of alcohols, esters, ketones in smaller quantities may be advantageously used to reduce viscosity further.

The varnishes made according to Examples 6 and 7 dry very fast and can replace cellulose ester lacquers advantageously on account of their fast drying properties. The additional advantages of the above varnishes over a lacquer are the higher solid content at spraying viscosity and greater filling power in case uneven surfaces are to be coated, like rough metal surfaces or wood, for example. The reference to spraying viscosity means that all lacquers and varnishes have to be reduced to a certain viscosity so that they may be applied by spray guns.

While China-wood oil yields the most solid oil products and the fastest drying varnishes under otherwise equal reaction conditions, other oils also have their drying velocity greatly increased when used in the processes described in this application. Such oils which may be used advantageously for instance in Example 7 are: linseed oil, Perilla oil, dehydrated castor oil, oiticica oil, soya bean oil, different grades of fish oils, sunflower oil and synthetic oils of drying nature.

When oils and resins are modified together, they yield, in many cases, faster drying varnishes than when the oil or resin is modified alone, and the varnish is made in a subsequent second step.

In Example 7 the resin used may be substituted by any other resin used in varnish making: e. g. ester gum (glycerin ester of rosin), rosin, rosin modified phenolic resins which are made by condensing phenol, formaldehyde and rosin and esterifying the product with glycerin. In other cases soluble A-stage condensate of phenols and aldehydes is fused into the rosin and glycerin is added for esterification. Other suitable resins are the alkyd resins, which contain besides polybasic acids (maleic and/or phthalic anhydrides), polyhydric alcohol (glycerin, glycols, pentaerythritol, sorbitol, mannitol), a rosin or another high molecular resin acid. Another important group is the so called pure phenolic or 100% phenolic resin group, in which case oil soluble, non-modified phenolic resins, made out of alkylated and other substituted phenols (p-tertiary amyl phenol, p-tertiary butyl phenol, etc.) are used. These resins are China-wood oil reactive, as they body the tung oil, yielding alkali and acid resistant fast drying varnishes. When used in this process they yield very fast drying varnishes.

When 2% benzidine base is added to the modifying agents of Example 7, based on the oil content, the water resistance and alkali resistance of the resulting varnish films is greatly improved.

Auxiliary agents mentioned above in this application reduce the time of dissolution of the modifying agent. Benzoic acid, salicylic acid and formic acid are among the most practical agents of this sort for Example 7.

EXAMPLE 8

300 parts of linseed oil and 30 parts of barium sulphide were heated in a closed vessel, under vacuum of 8-14 inches, without stirring, applying direct gas heat. The mixture was heated to 300° C. and kept for 5 hours between 290° and 310° C. The reaction mixture did not show appreciable frothing. The color darkened during reaction. Some of the modified agent remained undissolved. The product obtained was a soft brown solid, when cooled to room temperature. It is suitable as an oil base in varnish and paint manufacture.

EXAMPLE 9

150 parts of linseed oil, 3.75 parts of barium peroxide, 3.75 parts of zinc carbonate and 5.6 parts of formic acid were heated under vacuum with rapid stirring on direct flame. The reaction mixture was heated up to 290° C. in one hour and kept between 290° C. and 310° C. for 4½ hours. Frothing occurred even at room temperature, after the formic acid was added, and ceased only after 290° C. was reached. The product had a light brown color. Consistency: soft solid with a green fluorescence.

EXAMPLE 10

Example 9 was repeated, using benzidine base instead of formic acid, keeping weight proportions equal. The heating was continued for 5 hours at reaction temperature and a dark brown, fairly stiff, elastic solid was obtained. 100 parts of the resulting oil product and 50 parts of lime hardened rosin were fused together and the temperature was increased to 250° C., then the mass was cooled to 200° C., and thinned with 150 parts of mineral spirits. Cobalt driers were added in the proportion of 0.05% metallic cobalt, based on the oil content. A zinc oxide paint was prepared with this varnish the proportion being 1 part zinc oxide to 1 part varnish solids. Both the varnish and the paint had been tested, by brushing them out on tin panels, and examined for properties. The varnish dried dust-free in ½ hour, and to the dry but slightly surface-tacky stage in 2 hours. The paint reached the latter stage in ½ hour. After 48 hours drying, the panels were half immersed in cold water for 24 hours. They showed very slight milkiness after the test was concluded, which gradually disappeared on further air drying. The water resistance was improved, when compared with similar varnishes and paints, made out of the product of Example 9.

EXAMPLE 11

300 parts of linseed oil, 7½ parts of zinc carbonate and 7½ parts of lead peroxide were heated under vacuum, without stirring, by direct flame to 290° C. and the temperature was maintained for 5 hours between 290° and 310° C. Frothing began at 60° C. and subsided at 190° C. The product was a brown, very soft solid, with green fluorescence. When the lead peroxide was replaced in this example by nickel peroxide and atmospheric pressure applied, the product was a thin, brown oil with green fluorescence. When nickel peroxide was used under vacuum, the product was a brown, very soft solid, with green fluorescence. When the lead peroxide was replaced by manganese dioxide and heating was applied under vacuum, the product was a thick, light brown oil with green fluorescence. When magnesium peroxide was used instead of lead peroxide and the heating carried out under vacuum, the product was a fairly stiff, hard, brown solid. All the above oil products may be used in coating compositions or in plastics, besides other uses.

In the above examples the fatty oils and resins may be replaced by other isocolloids; especially by those yielding varnish bases, such as asphalts, like Trinidad asphalt or gilsonite, bituminous compounds, pitches, residues of petroleum distillation or of fatty acid distillation, like stearine pitch, byproducts of gum rosin and gum turpentine manufacture, like pine-tar oils, etc. All these products show acid values and iodine values, or in other words contain unsaturated carbon compounds of high molecular acidic nature. The reaction temperatures should be adjusted in each case to the nature, boiling point and decomposition point of the product in question.

EXAMPLE 12

A series of products were made out of a mixture of 2 parts of tung oil and 3 parts of linseed oil. 80 parts of this oil mixture and 20 parts of ester gum were heated to 290-300° C., with various quantities of modifying agents and heating continued for various intervals. As modifying agent zinc carbonate and barium peroxide was used, always in equal weight proportions. The resulting reaction product was cooled to 200° C. and thinned at this temperature with mineral spirits to 50% solids. Naphthenate driers were then added, in proportions of 0.03% metallic cobalt, 0.02% of metallic manganese and 0.30% of metallic lead, based on the oil content. The following proportions of modifying agents were tried: 5% of each, 2½% of each, 1¼% of each and 0.63% of each. The oil-resin mixes were heated to the reaction temperature and kept there for 2 hours, 1 hour, 30 minutes and 15 minutes, respectively. The varnishes were tested for viscosity, color, drying velocity and water resistance of the resulting films. The following observations were made: The higher the modifying agent ratio, keeping other conditions constant, the higher the viscosity of the resulting varnishes and the darker the color of the same. The longer the heating was maintained at reaction temperature, the higher the viscosity of the resulting varnishes. The higher viscous varnishes showed a very fast initial set, or initial drying, but on account of solvent retention, lost the surface tack slowly. The lower viscous varnishes dried initially slower, but became free from tackiness more rapidly. The milkiness of the varnish films in cold water immersion tests gradually decreased with the decreased viscosity of the varnishes. The lowest reagent (modifying agent) concentrations gave the best water resistance. This is probably due to the fact that, in case of larger modifying agent proportions, water soluble byproducts may be formed in the varnish bases, counteracting the effect of the modifying agents, themselves difficultly soluble in water.

The expression "varnish base" as used in this application is any constituent of the varnish solids including fatty oils, resins, natural resins and synthetic resins, and mixtures of oils and resins.

What is claimed is:

1. In the preparation of varnish bases, the process which comprises mixing an organic isocolloid varnish base material selected from the class consisting of fatty oils and varnish resins, with a metal salt of an inorganic acid, said salt being selected from the class consisting of metal carbonates, sulphides and sulphites which are difficultly soluble in water, the quantity of said metal salt being from about 2% up to about 10% of said varnish base, and thoroughly dispersing said metal salt in the varnish base by heating the mixture to a polymerizing temperature above 200° C. but not above 350° C. or the boiling or decomposition point of the mixture.

2. A process in accordance with claim 1 in which the metal salt is selected from the class consisting of carbonates, sulphides and sulphites of metals selected from the class consisting of the alkaline earth metals, zinc and magnesium.

3. A process in accordance with claim 1 in which the varnish base comprises a fatty oil.

4. A process in accordance with claim 1 in which the varnish base is selected from the class consisting of drying fatty oils and semi-drying fatty oils.

5. A process in accordance with claim 1 in which the varnish base comprises a varnish resin.

6. A process in accordance with claim 1 in which the varnish base comprises rosin.

7. A coating composition containing a varnish base material treated in accordance with the process of claim 1.

8. A coating composition containing a varnish base comprising a fatty oil in admixture with a varnish resin, which admixture is treated in accordance with the process of claim 1.

9. In the preparation of varnish bases, the process which comprises mixing an organic isocolloid varnish base material selected from the class consisting of fatty oils and varnish resins, with at least two treating agents both of which are difficultly soluble in water and each of which is present in an amount upwards of an appreciable fractional percentage, but the total content of the two agents combined not being more than about 30% on the basis of said varnish base material, one of said agents being selected from the class consisting of metal carbonates, sulphides and sulphites which are difficultly soluble in water, and another of said agents being a metal peroxide capable of reacting with said salt and the varnish base under the treatment conditions to produce a reaction product which is difficultly soluble in water, and thoroughly dispersing said agents in the varnish base by heating the mixture to a polymerizing temperature above 200° C. but not above 350° C. or the boiling or decomposition point of the mixture.

10. In the preparation of varnish bases, the process which comprises mixing an organic isocolloid varnish base material selected from the class consisting of fatty oils and varnish resins, with at least two treating agents both of which are difficultly soluble in water and each of which is present in an amount upwards of an appreciable fractional percentage, but the total content of the two agents combined not being more than about 10% on the basis of said varnish base material, one of said agents being selected from the class consisting of metal carbonates, sulphides and sulphites which are difficultly soluble in water, and another of said agents being a metal peroxide capable of reacting with said salt and the varnish base under the treatment conditions to produce a reaction product which is difficultly soluble in water, and thoroughly dispersing said agents in the varnish base by heating the mixture to a polymerizing temperature above 200° C. but not above 350° C. or the boiling or decomposition point of the mixture.

11. A process in accordance with claim 10 in which said peroxide is selected from the class consisting of barium peroxide, magnesium peroxide, zinc peroxide and strontium peroxide.

12. A process in accordance with claim 10 in which said metal salt is selected from the class consisting of carbonates, sulphides and sulphites of metals selected from the class consisting of the alkaline earth metals, zinc and magnesium.

13. A process in accordance with claim 10 in which the peroxide is selected from the class consisting of barium peroxide, magnesium peroxide, zinc peroxide and strontium peroxide and in which said metal salt is selected from the class consisting of carbonates, sulphides and sulphites of metals selected from the class consisting of the alkaline earth metals, zinc and magnesium.

14. A process in accordance with claim 10 in which the varnish base comprises a fatty oil.

15. A process in accordance with claim 10 in which the varnish base is selected from the class consisting of drying fatty oils and semi-drying fatty oils.

16. A process in accordance with claim 10 in which the varnish base comprises a varnish resin.

17. A process in accordance with claim 10 in which the varnish base comprises rosin.

18. A process in accordance with claim 10 in which said metal salt is zinc carbonate and in which said peroxide is barium peroxide.

19. A coating composition containing a varnish base material treated with the process of claim 10.

20. A coating composition containing a varnish base comprising a fatty oil in admixture with a varnish resin, which admixture is treated in accordance with the process of claim 10.

21. A coating composition containing a varnish base material treated in accordance with the process of claim 10 and in which said metal salt is zinc carbonate and said peroxide is barium peroxide.

LÁSZLÓ AUER.

CERTIFICATE OF CORRECTION.

Patent No. 2,324,900.                      July 20, 1943.

LASZLO AUER.

It is hereby certified that error appears in the printed specification of the above numbered patent requiring correction as follows: Page 1, second column, line 21, after "examples" strike out the comma; page 2, first column, line 20, for "modiyfing" read --modifying--; page 3, first column, line 45, for "resides" read --residue--; page 4, second column, line 42, after "above" strike out the hyphen; page 5, second column, line 40, after "Mercaptobenzthiazole" strike out the period and insert instead a semicolon; line 65, after "accordingly" insert a period; page 6, first column, line 9, for "(Patent 2,083,540)." read --(Patent 2,083,549).--; and second column, line 71, for "alky" read --alkyd--; page 7, first column, line 21, for "faciltate" read --facilitate--; page 9, second column, line 27, after "treated" insert --in accordance--; and that the said Letters Patent should be read with this correction therein that the same may conform to the record of the case in the Patent Office.

Signed and sealed this 5th day of October, A. D. 1943.

(Seal)                                                       Henry Van Arsdale,
                                                             Acting Commissioner of Patents.